(12) United States Patent
Richfield

(10) Patent No.: US 9,229,213 B2
(45) Date of Patent: Jan. 5, 2016

(54) COINCIDENT FOCUS MICROSCOPE HAVING SUPERIOR RESOLUTION AND CONTRAST IN THREE DIMENSIONS

(71) Applicant: Steven E. Richfield, Edgewood, WA (US)

(72) Inventor: Steven E. Richfield, Edgewood, WA (US)

(*) Notice: Subject to any disclaimer, the term of this patent is extended or adjusted under 35 U.S.C. 154(b) by 0 days.

(21) Appl. No.: 14/287,986

(22) Filed: May 27, 2014

(65) Prior Publication Data

US 2014/0347460 A1  Nov. 27, 2014

Related U.S. Application Data

(60) Provisional application No. 61/827,363, filed on May 24, 2013.

(51) Int. Cl.
| | | |
|---|---|---|
| *G02B 21/36* | (2006.01) | |
| *G02B 21/16* | (2006.01) | |
| *B23K 28/00* | (2006.01) | |
| *G02B 21/08* | (2006.01) | |
| *G02B 27/58* | (2006.01) | |

(52) U.S. Cl.
CPC .............. *G02B 21/367* (2013.01); *B23K 28/00* (2013.01); *G02B 21/082* (2013.01); *G02B 21/16* (2013.01); *G02B 27/58* (2013.01)

(58) Field of Classification Search
CPC .................................................... G02B 21/367

USPC ............................................................ 348/79
See application file for complete search history.

(56) References Cited

U.S. PATENT DOCUMENTS

| 3,774,510 | A | * | 11/1973 | Johnson ........................ 396/106 |
| 5,905,561 | A | * | 5/1999 | Lee et al. ...................... 623/6.31 |
| 6,624,932 | B2 | * | 9/2003 | Koetke .......................... 359/389 |
| 2005/0121392 | A1 | * | 6/2005 | Hoffman ........................ 210/656 |
| 2007/0081127 | A1 | * | 4/2007 | Liang et al. ................... 351/206 |
| 2009/0214135 | A1 | * | 8/2009 | Liu et al. ....................... 382/296 |
| 2012/0265331 | A1 | * | 10/2012 | Chu et al. ...................... 700/103 |
| 2013/0280752 | A1 | * | 10/2013 | Ozcan et al. .................... 435/29 |

OTHER PUBLICATIONS http://zeiss-campus.magnet.fsu.edu/print/spinningdisk/introduction-print.html  http://zeiss-campus.magnet.fsu.edu/articles/spinningdisk/introduction.html.

* cited by examiner

*Primary Examiner* — Christopher S Kelley
*Assistant Examiner* — Jonathan Messmore
(74) *Attorney, Agent, or Firm* — Craig M. Stainbrook; Stainbrook & Stainbrook, LLP

(57) ABSTRACT

A microscope having an objective lens and illumination means configured in combination such that said illumination means illuminates a specimen through a different region of the objective lens than that used for observation, and having an opaque region separating the illumination and observation regions. The basic optical design is capable of resolving optically isolated micron-sized voxels deep within tissue, without the use of a computer and when illuminated only with visible light.

20 Claims, 5 Drawing Sheets

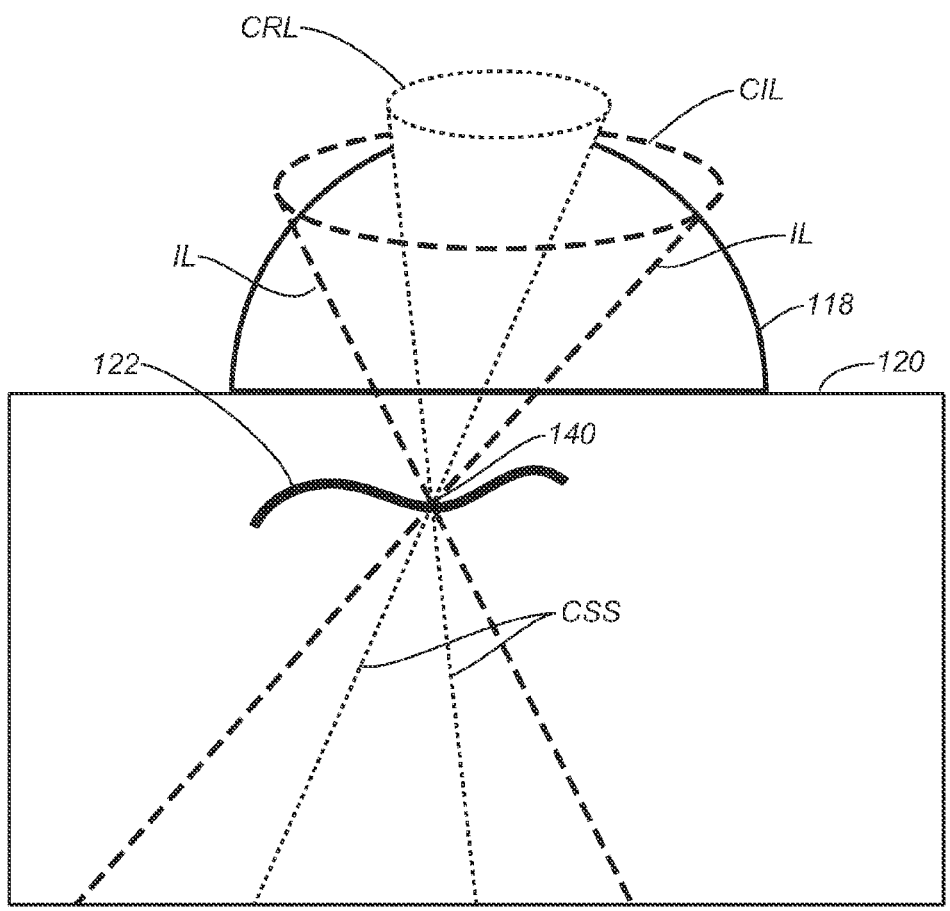
FIG. 2
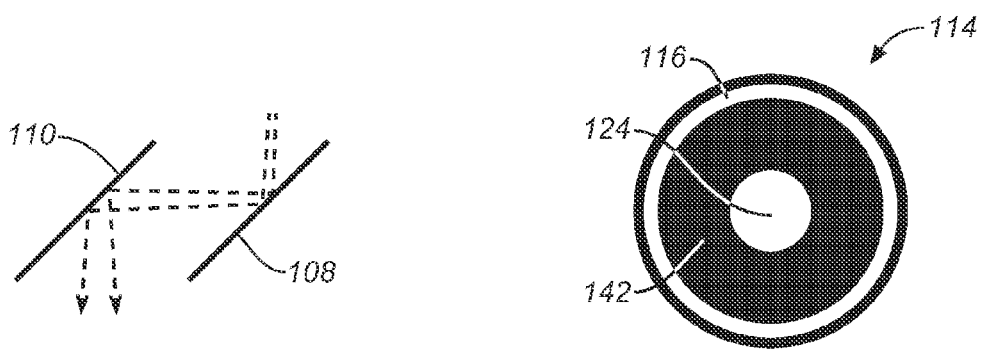
FIG. 3A  FIG. 3B

COINCIDENT FOCUS MICROSCOPE HAVING SUPERIOR RESOLUTION AND CONTRAST IN THREE DIMENSIONS

CROSS REFERENCES TO RELATED APPLICATIONS

The present application claims the benefit of the filing date of U.S. Provisional Patent Application Ser. No. 61/827,363, filed May 24, 2013 (May 24, 2013), which is incorporated in its entirety herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

1. Field of the Invention

The present invention relates generally to microscopy, and more particularly to ultraviolet and near ultraviolet microscopy, and still more particularly to a microscope having an objective lens and illumination system configured in combination such that the illumination system illuminates a specimen through a different region of the objective lens than that used for observation.

2. Background Discussion

Much of biological research, neuroscience research, artificial general intelligence research, and numerous other relatively exotic and esoteric areas of research are now substantially "hung up" on practical technological limitations; to with, the lack of suitable equipment and instrumentation. The limitation resides most particularly in the present inability to "functionally diagram" tissue, especially brain tissue. When it becomes available, functional diagramming may be as transformative to neuroscience and several other fields as were computers.

To date, the most ambitious functional diagramming project was performed manually. It involved diagramming the 302 neurons in the nematode (roundworm), Caenorhabditis elegans. The database is now on-line. Unfortunately, without the capabilities of the UV CT microscope and the method of using it, as described herein, that database does not include component values. And without component values, researchers are unable to label even the neurons with any detail beyond neuron type: "sensory", "interneuron", and "motor."

Cognition is primarily concerned with interneuron functionality, which is determined by component values, such as synaptic efficacy. The same neuron in different subjects may have different functions, as the operation of each neuron may result from self-organization. Hence, a useful analysis would have to be completed on a single subject, which precludes all but fully automated methods.

Each synapse likely has several quantitative component values. Aside from efficacy, there may be a variety of statistical accumulators that control changes (learning), nonlinearities that may be needed for certain computations, synaptic integration and/or differentiation, along with other as-yet unknown characteristics.

Many informal proposals have been made for methods of diagramming. The primary challenge in diagramming is that each method produces neuron images differently, so that gaining understanding of the operation of living tissue using one method may not be transferable to other methods for diagramming. However, when the functionality of neurons and synapses is more fully understood, diagramming methods unusable on tissue (e.g. scanning electron microscopy) might indeed become applicable and may even produce superior diagramming results.

Diagrams are needed to understand neurons, and neuronal understanding is needed to produce better diagrams. This proposition expresses the next logical step on the long path to complete neuronal understanding, leading to the production of accurate functional diagrams.

Moreover, better understanding of neuronal function is expected to lead to mathematical algorithms to "fill in" and "clean up" what the present invention "sees," to produce a result that far exceeds the imaging capabilities of the present invention.

The fundamental limitation in resolution is approximately $\frac{1}{3}$ of the wavelength used for illumination or observation. This limitation applies to all methods, from MRI to electron microscopes. Like most tissue, brain tissue is transparent to radiation of nearly all wavelengths into the near UV region, whereupon the tissue becomes opaque. Due to this transparency to visible light, it is possible to directly observe the veins in one's wrist. Opacity to shorter wavelengths is the basis of Lasik eye surgery, as its use of short wavelength UV affects only the surface cells.

For diagramming purposes, observation must be made at near-UV wavelengths to utilize transparency at maximum possible resolution. Alternatively, methods not relying on transparency must be employed. Unfortunately, not enough is known to understand what might be seen at higher resolutions. Without transparency, there is presently no known way to observe detail in living neurons, a necessary requirement to close our present gap between form and function.

Near-UV has another advantageous feature for this application; namely, that in addition to being able to see near-UV light scattered by the interfaces between transparent structures having differing indexes of refraction, complex molecules naturally fluoresce when exposed to near-UV. Their natural fluorescence provides for a limited chemical analysis of complex molecules at points in tissue—a feature not available with other methods. Conventional subtractive staining provides fluorescence, but it hides structures beneath the stained details, making it unusable for diagramming.

The problem in using natural fluorescence is that it is extremely weak, due to the low number of fluorescing molecules present in complex tissue. It has been observed in the laboratory, e.g., observing fluorescent flashing from living neurons as they operate, but only low quality images using complex setups have been produced, and this has precluded its use in diagramming. It is the object of the present invention to bypass this historical barrier.

It would appear, then, that it would be advantageous to diagram utilizing near UV scattered light and fluorescent microscopy techniques. However, there is a residual problem. Present confocal microscopy methods fail to produce images of sufficient quality from bulk tissue to use for automated diagramming. The present invention advances a method of utilizing common focus microscopy, separated point scanning, and UV computed tomography (UV CT) to overcome those shortcomings.

In the late 1960s, Marvin Minsky of MIT's AI lab developed the first working machine vision system able to successfully parse visual scenes, thereby paving the way for the sorts of brain diagramming now contemplated. Marvin Minsky also invented the confocal microscope. Soon after there was an early effort at Carnegie Mellon University to diagram insect brains using a computer program written by Michael Everest. Researchers attempted to microtome slices of the brains and to stain them for microscopic scanning using 2D visible light methods. The effort failed because some slices were inadvertently destroyed, and staining is a subtractive process (whereas scatter and fluorescence are additive) so that it was impossible to see anything behind a stained detail. Further, large microtome slices must be >4μ thick to withstand handling, but some important parts of neurons (axons, for instance) may only be 1μ or less wide. The present invention provides more than an order of magnitude more real-world resolution than prior methods by working in 3D with ultraviolet, and uses UV CT to extract more detail than present visual methods can extract.

To date there have been no successful automated brain diagramming projects. Automated brain diagramming appears to be impossible until microscopes similar to the present invention are available. To diagram brains, such a microscope will require the largest supercomputers now available to deal with the overwhelming computational load that can produce whole-brain diagrams in months, rather than centuries.

It may prove impossible to fully diagram brains through observation alone, as the present invention seeks to do, and this would be due to structural details not microscopically observable at practical speeds by any conceivable method. It is hoped and expected, however, that other methods not based on observation will provide the missing details, e.g., by applying analytical methods to infer that which cannot be seen.

Background Technology:

Perhaps the best discussion of the technical background can be found at the Carl Zeiss Microscopy Online Campus web page, entitled, "Digital Imaging Considerations" [see http://zeiss-campus.magnet.fsu.edu/print/spinningdisk/introduction-print.html]. Therein, the best prior art methods, those utilizing lasers and Petráň disks, are discussed for digitally imaging tissue. These methods do not utilize the methods and apparatus of the present invention. The present invention is an optical improvement independent of the scanning method.

Note that there are speed problems in performing fast real-time scanning with a single moving spot. This can be easily eliminated in systems with an intelligent pseudo-random scanning capability, because not every point must be scanned with every frame. All that must be scanned with every frame are points around various edges to identify when, and in what direction, they move, and one point within each structure to identify when its chemistry changes. Changes in these parameters would then trigger other localized scanning. This will speed up the scanning process by 100:1 or more.

BRIEF SUMMARY OF THE INVENTION

The present invention takes advantage of several well-known principles, including:

Chemical components of brain tissue fluoresce when exposed to blue or near-UV light.

Brain tissue is transparent at microscopic scales.

The boundaries between transparent structures having differing indexes of refraction are made visible because the change in index of refraction reflects light when flat like a window, but scatters light from very small and/or rough biological structures.

Brain tissue can be accurately sectioned away in 4μ slices when held at −4° C.

Observing tissue illuminated with light traveling along a different path than the light from tissue being observed will only reveal the tissue that simultaneously lies on both paths.

Functions and Features of the Invention:

The UV CT fluorescence microscope of the present invention achieves full UV resolution in 3D while reading out chemical composition. The inventive microscope comes in two forms: (1) a laboratory instrument to identify what physical structures in living tissue, identified by their time-dependent fluorescence spectra, perform what computational processes; (2) an automated tissue diagramming machine, which incorporates the information gained from the laboratory version, and diagrams the surface ~10μ of frozen tissue, removes ~4μ, and repeats this process, one slice at a time, until the entire brain has been completely diagrammed. Since the slices are immediately discarded, past problems of preserving, processing, and analyzing them are eliminated.

The present invention comes at the end of a half-century of advancements in electro-optical microscopes of various sorts. While the inventive UV CT fluorescence microscope has far less resolution than electron microscopes, it has other crucial characteristics now needed to move cognitive computing forward, including the ability to examine living tissue and the ability to perform limited chemical analysis on individual 3D voxels.

The UV CT fluorescence microscope rapidly flashes weak focused spots of near-ultraviolet light into biological samples at various places and depths and records the fluorescence spectra and decay rates at those places. A computer analyzes the decay spectra and profiles, and then reconstructs the 3D structure.

The present invention is capable of structural and chemical imaging in 3D with considerably better than visible light resolution. Further, by analyzing to a sufficient depth, e.g. ~10μ, the top layer can then be sliced using a microtome and the process continued through an entire brain, with enough redundant overlap to ensure that there would be no gaps in analysis, even if there were a problem removing one or even two of the ~4μ sections. With these instruments it should eventually become possible to automatically construct the complete functional diagram of a brain, including individual synapse characteristics and other similar details.

The UV CT fluorescence microscope can also non-destructively observe the operation of living cells in far more detail than is currently possible with direct visual observation. Researchers now routinely observe living neurons in operation under UV fluorescence because the fluorescence changes as they operate, but the resolution is poor and the image quality is poor. The addition of analyzing to improve resolution and provide depth separation and real-time logging makes it possible to characterize synapses by their appearance under fluorescent conditions as their electrical operation is simultaneously observed.

Perhaps the most unique characteristic of the present invention is that, unlike other microscope constructions, there is no optical image or continuously scanned lines from which to construct an image. Instead, the color and decay characteristics of isolated points are recorded and subsequently arranged in computer memory for later display and/or analysis. This class of powerful microscopes has gone entirely undeveloped to date.

Pertinent Basic Physics:

Complex molecules often fluoresce. A higher-energy photon (or simultaneous lower-energy photons) activates the molecules, resulting in the occasional delayed release of lower-energy photon(s). Chemicals can be identified by the energy needed to activate them, the energy of the released photon(s), the delay between activation and fluorescence, the recovery time, and the response to photobleaching. Where several chemical constituents are present their fluorescence is combined, and a computer may be required to unravel the combined fluorescence, or it may be looked up in a library of common combinations.

A point within tissue can be chemically analyzed by flashing a point of UV or blue light through the tissue, focusing at the point and observing the visible-light fluorescent decay. The visible light is a combination of the fluorescent decay of everything at that point, plus far more light from everything around the point illuminated by the UV or blue light. However, clever optical design can limit all but the intended field of view. Computerized deconvolution and image enhancement cleans up any remaining artifacts.

The basis of successful diagramming is 3D chemical mapping. The image is not a color image but is instead a 3D map of the spectral and decay characteristics at the many points in the tissue. A computer analyzes the image and forms a map of the chemicals present. From the chemical map the computer can infer the structure, and from the structure the computer can infer function, and then it can relate each functional element to neighboring elements by examining the chemical and electrical interfaces. Outputs can be annotated diagrammatic views and functional diagrams for later analysis.

A little-known technique to increase resolution roughly 50 percent in almost any optical system is to block the center of the aperture. The more of the center blocked, the greater the gain in resolution, so that a thin ring of open aperture can resolve things only ~⅔ the size of what can be seen with the entire aperture open. Analyzing the Airy Disk dispersion pattern from doing this, the first ring is only ⅔ of the radius, but it is 3 times as bright—15%, compared with 5% for an open aperture. This can create visible rings around point sources, but it does make it possible to resolve details only ⅔ as far apart as an open aperture can resolve. Not only do the artifact rings present no problem for computed tomography, they provide additional details to assist the computer in the image reconstruction process via deconvolution.

The present invention utilizes this method to propel its resolution well beyond the open-aperture "theoretical maximum" for the near UV wavelengths used. The essence of the invention is that it provides a process of directing and restricting the light paths, so that the cone of illumination only intersects the cone of receptivity in an extremely small region.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 2 is a highly schematic detailed magnification of the tissue sample shown in FIG. 3, illustrating the illumination and pickup fields within the tissue being observed, wherein the reference numbers are the same as in FIG. 2 [numerical references 118 through 122 are directed to the same elements in FIG. 2];

FIG. 3A is a schematic side view in elevation showing incident light coming from the LED array reflected by two parallel diagonal mirrors and directed down the axis of the microscope;

FIG. 3B is a schematic top plan view showing detail of the complex optical stop as shown in FIG. 2;

DETAILED DESCRIPTION OF THE INVENTION

Figure 1:
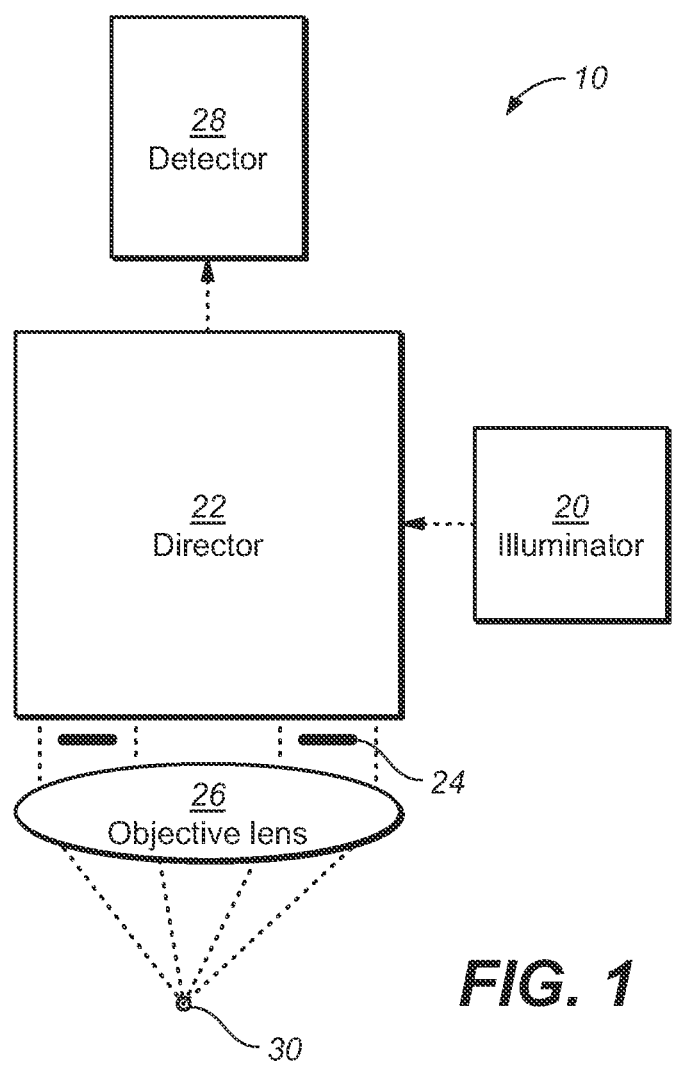
FIG. 1 is a highly schematic diagram showing the essential operational elements of the inventive microscope.

As used herein, the following terms have the following meanings [wherein bold italics are used to highlight the term defined, and thereafter the term is shown in regular typeface]:

anastigmatic: a lens design that reduces the effects of astigmatism.

annotated diagrammatic view: an enhanced image with details written in text and imposed on the view.

apochromatic: corrected at three or more colors, one of which could be the near UV used to illuminate samples.

astigmatism: a form of off-axis distortion where different regions of a lens have differing focal lengths.

common focus: a new microscopy technique where the illuminating light and the observed light travel along different paths through the microscope's objective lens. This provides considerable advantage over confocal methods. Only a small volume of tissue is both illuminated and visible, thereby greatly reducing the noise attendant in image reconstruction. The application of computed tomography can further reduce the volume represented by an isolated pixel to the smallest spot that can be produced with UV illumination, even though the volume that could produce recoverable visible light is much larger.

computed tomography: the class of computing techniques that builds 3D images from automated observations, able to present 2D virtual slices from a 3D image, in addition to other useful views, such as pictorial and functional diagrams.

concentric focus: common focus, where the illuminating and observed light travel along concentric conical paths.

confocal: a microscopy technique wherein illuminating and observed light passes along the same paths while going in opposite directions through the microscope's objective lens. The present invention uses a different but related technique, see "common-focus".

confocal-like: a descriptive term for common-focus, see "common-focus".

convolution: what happens in laboratory instruments that causes them produce less than perfect images.

cytometry: an analytical method capable of precisely quantifying the functional states of individual cells by measuring their optical characteristics, based on fluorescence or scattered light.

diagramming: the process of "understanding" a 3D image sufficiently to convert it to a useful diagram. Diagrams can be pictorial, like a street map that overlays a satellite photo, or functional, like a wiring diagram.

deconvolution: the process of undoing a convolution, e.g., to extract a sharp image from a blurred image. This area was most thoroughly researched while looking for ways to recover the blurred images from the distorted mirror in the Hubble Space Telescope, before the decision was made to install an optical correcting lens.

dichroic: refers to color-selective filters and mirrors that pass or block specific colors or ranges of colors, while blocking or passing all other colors, so they absorb little if any light. These are made by depositing onto glass successive layers of material having different indexes of refraction.

fluorescence: the process whereby many materials absorb more energetic (bluer) photons, and then emit less energetic (redder) photons. Living tissue, especially brain tissue, is richly fluorescent, but the fluorescence is weak, necessitating sophisticated measures to separate the weak fluorescent light from the strong illuminating light.

functional diagramming: (also referred to as neuromorphic diagramming or computational diagramming) is the process of identifying the functional interrelationships of the components of cells and their quantitative interrelationships with other cells, and then filing this information into a database without regard for the physical structure and dimensions being represented. A circuit diagram is a type of functional diagram.

microtome: a type of meat slicer designed to cut tissue into very thin slices, with ~4µ being the lower practical limit on thickness for large sections.

nanosurgery: precise surgery performed on selected targets within individual living cells.

Nipkow disk: a round rotating disk having a spiral arrangement of holes, such that when viewed through a small aperture, the holes scan successive lines of an image.

Petráň disk: a round rotating disk similar to a Nipkow disk, but having several concentric spiral arrangements of holes, such that when viewed through a small aperture, the holes simultaneously scan several lines of an image.

scanning: refers to collecting every point in a sample. Past methods have scanned adjacent points in sequence, whereas the present invention "scans" separate points that are geometrically isolated from each other, with a brief time delay before scanning nearby points. This provides adequate time for points to demonstrate their fluorescence, their location being presumed to be the illuminated coordinates, which remain valid only until a nearby point is illuminated. Many points can be analyzed simultaneously.

signal-to-noise ratio: the ratio of the intensity of light coming from points of interest in a specimen, to the intensity of light coming from other points in a specimen, such that through random chance the light trajectory enables it to reach the image.

super resolution: the capability of achieving resolutions from optical systems that substantially exceed that possible using conventional full-aperture visible-light methods. This can be achieved by various means to provide approximately twice the resolution of conventional visible light systems: (a) Illuminating with near UV, in a way where full near UV resolution can be attained, e.g. through the use isolated point scanning; and (b) illuminating using only the periphery of the objective lens, which can improve resolving power by ~3:2, at the cost of producing a ring pattern around objects that looks bad, but which computed tomography can not only eliminate, but utilize to assist its operation. This method is so little known that it was not incorporated into the Hubble Space Telescope.

virtual slice: observations along a plane below the surface of a tissue sample. Because of irregularities in physical slicing, and the flatness of field irregularities in the microscope objective, virtual slices may not be precisely parallel to the surface of the tissue sample.

voxel: similar to a pixel, but refers to a tiny 3D region of tissue being imaged as a point, whereas a pixel refers to a 2D point on a display.

virtual voxel: the volume of a point within tissue that can be extracted using digital scanning, deconvolution and image enhancement, which is typically only a fraction the size of a raw voxel that can be seen without using these methods.

With the foregoing in mind, we refer first to FIG. 1, which shows that in the present invention an illuminator 20 produces (typically near-UV) light to illuminate a point or small region within a (typically tissue) sample. This may be a small illuminated disk, a scanning spot, or a stationary spot that the director 22 is scanning.

The director 22 directs the light from the illuminator 20 around the outside of the annular optical stop 24, and it passes light returning through the central area of the annular optical stop 24 to the fixed or scanning image detector or eye 26. Alternatively, the director may reverse the usage of the two regions of the lens, directing illuminating light through the center, and passing light returning around the outside of the annular optical stop to the fixed or scanning image detector or eye 26. Director designs may also include scanning capability, e.g., through with the use of a mirrored vibrating membrane.

The annular optical stop 24 (schematically shown in cross section in this view) ensures that there is no common optical path shared by both the illuminator 20 and the detector 26. This component can be omitted at the cost of considerable degradation in image quality, albeit still leaving the microscope capable of producing images superior to those produced by other methods.

The objective lens 28 is typically a multi-element microscope objective. Design constraints may put some elements on the other side of the annular optical stop 24, resulting in an integrated objective lens assembly that incorporates the annular optical stop at approximately the point in the objective lens where the light rays are traveling approximately parallel with the axis of object lens assembly.

The microscopic region or voxel 30 is the only point simultaneously visible to the detector while receiving light from the illuminator. This can be a tiny, barely-resolvable voxel, or a small region viewed in its entirety without scanning, at the cost of reduced image quality over scanning methods. Since other points in the sample will have no effect on the image, despite being just slightly nearer or farther away from the objective lens 28, images will be clear and sharp and suitable for quantitative analysis.

The fixed or scanning image detector or eye 26 forms an image from light selected and received by the director 22 and annular optical stop 24. Where scanning techniques are used, the detector scans in lockstep with the illuminator, detecting both light that has been instantly reflected or scattered from structures 32 in the tissue being observed, and fluorescent light that has been emitted during the microsecond(s) following illumination. Scanning in the director 22 assures perfect synchronization.

Figure 3:
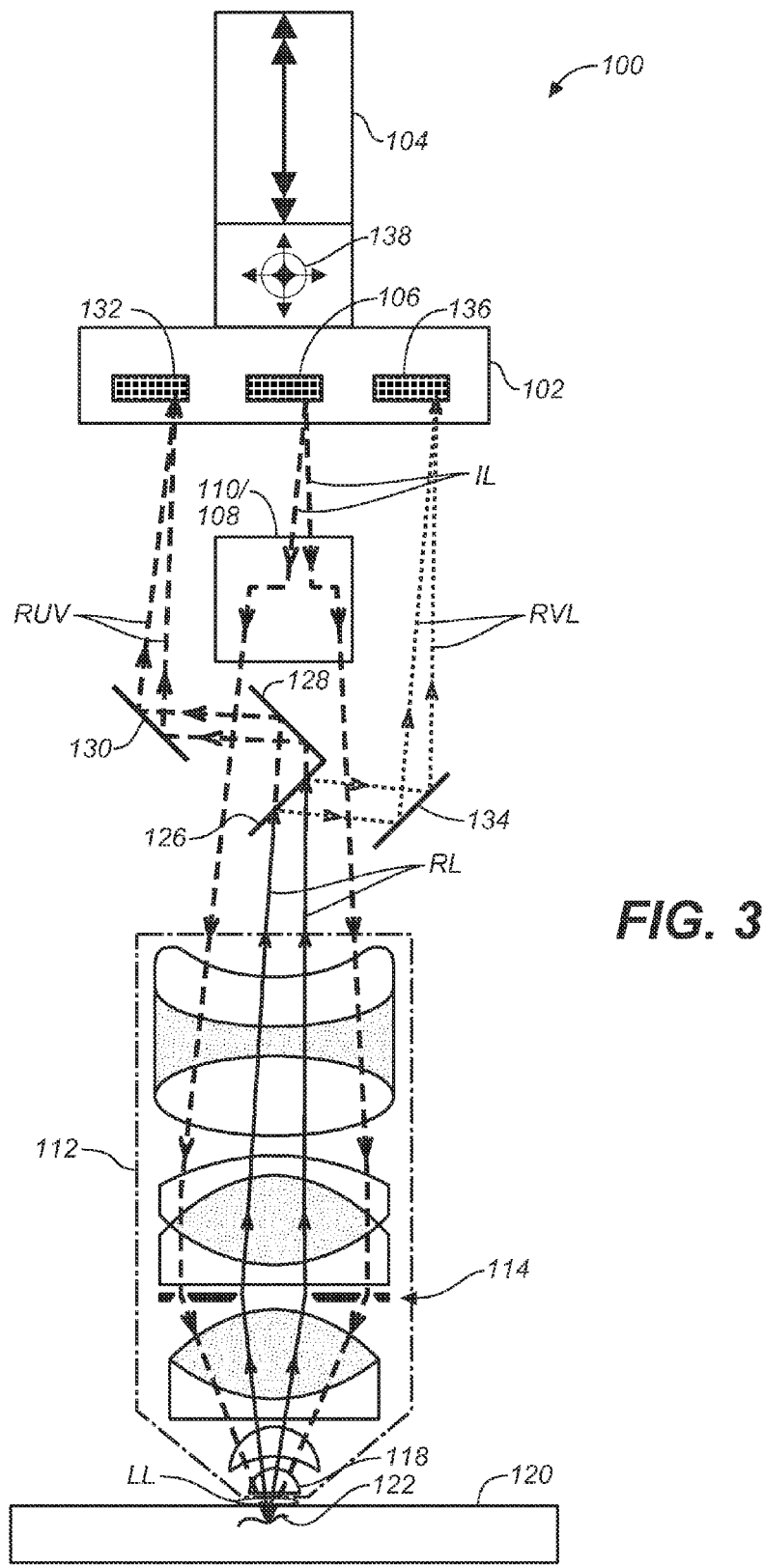
FIG. 3 is a highly schematic view in elevation showing the configuration and operation of the inventive microscope 1 system, not drawn to scale.

FIGS. 2-3B further illustrate the inventive light handling process utilized to make visible only a tiny region in a sample at any given moment in time. The vast majority of the wide cone of incident UV light passes through and continues beyond its point of focus to proceed millimeters beyond and eventually be absorbed. Less than 1% of the above incident UV light reaching an irregularity within the sample is either scattered or causes fluorescence.

Some of the fluorescent or scattered UV light proceeds back along the microscope's cone of receptivity. This is only possible for points that are within less than a micron of the focus of the incident light, because of the cone of receptivity is focused at the same point.

FIG. 2 shows the illumination comprising the outer cone, but the cones could easily be reversed so that the inner cone is illuminated and the outer cone is observed. There are advantages and disadvantages both ways, as reversing the cones results in a smaller micron-sized region to deconvolve, but reduces the ultimate potential resolution. Thus, it would be valuable to be able to switch between modes of operation, depending on the desired tradeoff between speed and resolution.

Referring now to the features and elements of FIG. 2, it will be seen that the vast majority of the wide hollow cone CIL of incident UV light passes through and continues beyond its point of focus 124 to proceed millimeters beyond and eventually be absorbed. There is a narrow cone of sensitivity where the microscope can process returning light. These two coaxial cones of illumination and receptivity intersect in a tiny region 140 only about a micron in size. Within one of these 3D micron-sized regions there are about a thousand UV-resolvable prospective voxels. Less than 1% of the incident UV light reaching one of those tiny regions is scattered or produces fluorescence to be seen by the microscope, and only a tiny fraction of that light comes from the point of focus and proceeds back along the narrow cone of receptivity. The cone of returning light CRL has much lower resolution, because its numerical aperture is lower, and because fluorescence is longer-wavelength light. Hence, the incident blue or near UV, and not the returning visible light, determines the ultimate computer-recovered resolution of the system.

Sensitivity within one of the above tiny micron-sized regions is "lumpy," with maximum sensitivity in the center and areas of higher and lower sensitivity created by a combination of the 3D Airy disk diffraction pattern of the UV illumination, and the intersection of two cones. A computer can partially deconvolve the resulting transform to extract image details down to full UV resolution, but it will be ultimately limited by the fact that the Airy disk transform is a perfect special low pass filter.

Note that the narrow cone of receptivity extends far beyond the target 122, past which it becomes a cone of stray sensitivity CSS, in which stray light can impair operation. For stray photons from inside the CRL or CSS cones but outside of the target zone 140 to degrade operation, they must be on a trajectory that either extends to or passes through the target zone 140 to find their way to a problematic pixel in a image sensor. For points far removed from the target zone 140, lining up with this micron-sized zone becomes very unlikely. Therefore, the system is quite insensitive to stray light from within the CRL or CSS cones, but distant from the target zone 140.

FIGS. 3-3B schematically show the configuration and operation of a preferred embodiment of the optical system of an apparatus utilizing solid state imaging components that are not yet available in the marketplace. FIGS. 3-3B are not drawn to scale. The three optical subsystems for the 2D blue & near UV multicolor LED array 106, the 2D blue & near UV image sensor 132, and the 2D color camera image sensor 136 are mounted on a carrier 102 and triangularly opposed about the optical axis of the objective lens for compactness and a cylindrical form factor. The subsystems are shown side-by-side for clarity. FIG. 3 shows an apochromatic lens 112 similar to U.S. Pat. No. 3,912,378 (incorporated in its entirety by reference herein), but other configurations could also be used.

In FIG. 3, the three optical subsystems 106, 132, and 136, are all mounted on a moveable carrier 102 that is moved along the optical axis by a mechanical actuator 104 by an amount sufficient to achieve the desired depth of analysis from the system. A 10μ depth of analysis requires ~1 cm of movement. In operation, one LED from within an array of blue & near UV LEDs 106 is illuminated. The incident light coming from the LED array bounces off of two parallel diagonal mirrors 108 and 110 to be directed down the axis of the microscope. The beam splitter 126 and the diagonal mirror attached to it 128 blocks the central portion of this light, which is important to keep the incident UV out of the center 124 of the complex optical stop 114. The incident UV then proceeds into the prior art objective lens assembly 112. At approximately the optical center of the objective lens assembly is a complex optical stop 114. Only incident UV light striking the clear peripheral ring of the complex optical stop can make it through. No incident UV light can strike the central clear area, because it is in the shadow of the beam splitter assembly. Once past the stop, the incident UV light is focused by the remaining elements of the prior art objective lens assembly 112 to a point on a detail 122 within the tissue sample being examined 120. The reader will note that FIGS. 1 and 3 show gaps between components, where light travels from one component to the next. Modern laboratory confocal microscopes already have some of these components, and many have sufficient space to add the remaining components to implement the present invention without "connecting" the additional components to the other components in any way other than physical mountings and functionally by virtue of the light that travels between the various components.

Light returning from the tissue sample is a combination of scattered UV, and visible light from fluorescence. It follows a path back through the tissue sample 120, through the last lens in the objective lens assembly 118 and proceeds into the objective lens assembly 112 to the center 124 of the complex optical stop 114, proceeds through the remainder of the objective lens assembly 112 to the dichroic beam splitter 126. Some stray light passes through the peripheral clear region 116 of the complex optical stop 114, but there is no optical path from there 116 to any of the image sensing devices.

The dichroic beam splitter 126 allows blue and UV to pass through and on to diagonal mirrors, 128 and 130, to guide the returning scattered UV to the 2D blue and UV image sensor 132. In the preferred embodiment, the diagonal mirrors 128 and 130 are dichroic mirrors that reflect blue and UV, but pass visible light, only to be absorbed by a black coating on their backs.

The dichroic beam splitter 126 bounces visible light to diagonal mirror 134 that guides the visible light on to the 2D color camera image sensor 136. In the preferred embodiment, diagonal mirror 134 is a dichroic mirror that reflects visible light, but passes blue and near UV, only to be absorbed by a black coating on its back.

The active areas of the pixels on the illumination and image sensing devices 106, 132, and 136 occupy only part of the area on those devices. Outboard piezoelectric or other micro-movement actuators 138 could be added to the carrier 102 to shift all of the devices by a fraction of a pixel, to achieve more than twice the inherent resolution of the illumination and image sensing devices. Further, by providing up to 2 pixels in range of motion, the array devices can be shifted sufficiently to work around dead pixels in any of the devices, and even work around lines of consecutive dead pixels by shifting in a direction that is orthogonal to a line through the dead pixels.

Figure 4:
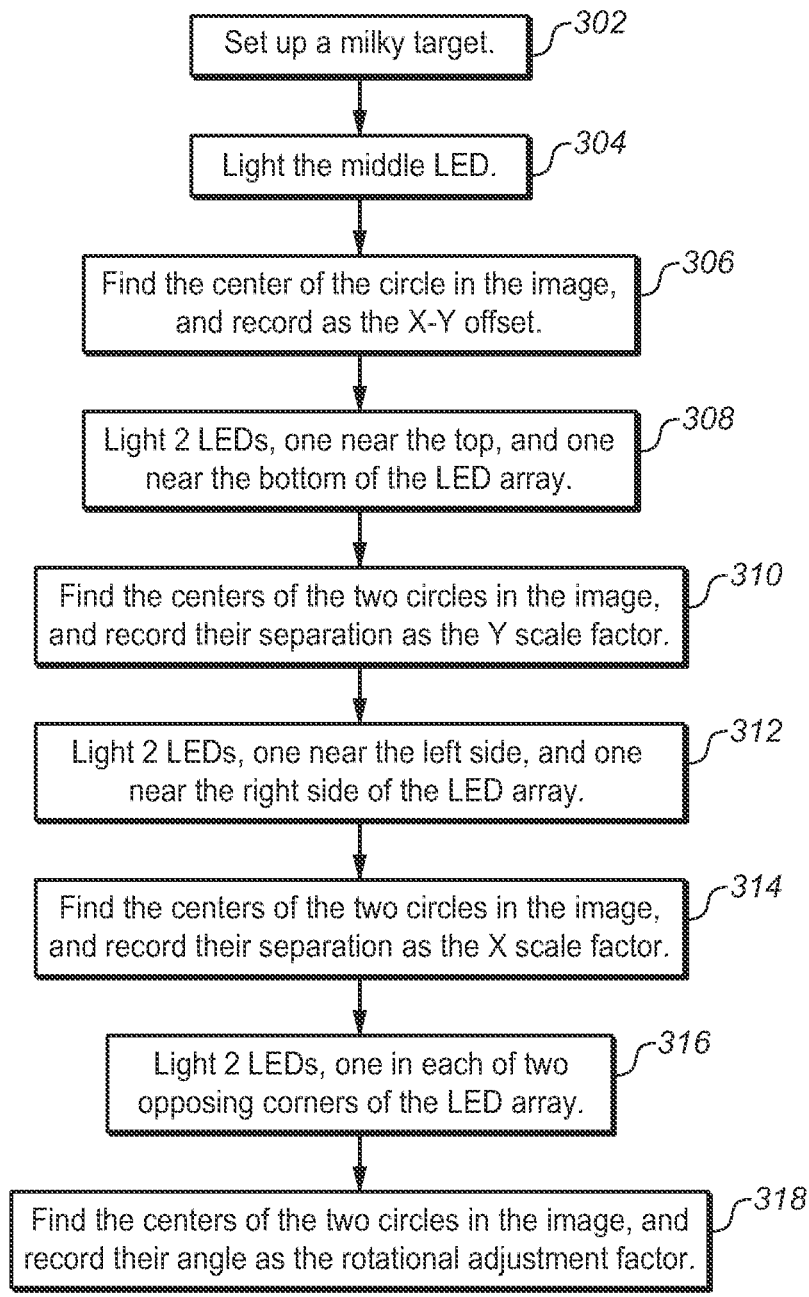
FIG. 4 is a block diagram of the electronic alignment process, without which extreme precision would be required during assembly.

Referring next to FIG. 4, there is shown the electronic alignment process 300 used by the present invention. Without this process, extreme precision would be required during assembly. A slightly milky and uniformly slightly fluorescent alignment target is placed in front of the instrument 302. The middle LED in the UV LED array is then illuminated 304. The returning circles of scattered UV and visible light are measured to find their "center of gravity" despite any distortions in their fuzzy edges, and the differences in coordinates between the centers of the circles and the position of the illuminated LED are noted, as this represents the overall system alignment error to be applied to all future readings. Then, two LEDs are illuminated, one centered near the top of the LED array, and the other centered near the bottom of the LED array 308. Any differences between the separation between the centers of the two circles of returning light and the distance between the two illuminated LEDs then indicate differences in vertical scale, to be applied to all future reading 310. Two LEDs are again illuminated 312, one centered near each side of the LED array. Any differences between the separation between the centers of the two circles of returning light and the distance between the two illuminated LEDs then indicate differences in horizontal scale, to be applied to all future readings 314. Then, two LEDs are again illuminated 316, one in each of two opposing corners of the LED array. Any differences between the angle of the centers of the two circles of returning light and the angle of the two illuminated LEDs then indicates residual rotation, to be applied to all future readings 318. The foregoing explanation is provided for ease of understanding. In practice, all of the method steps can be performed simultaneously by illuminating the LED array with an appropriate test pattern.

Figure 5:
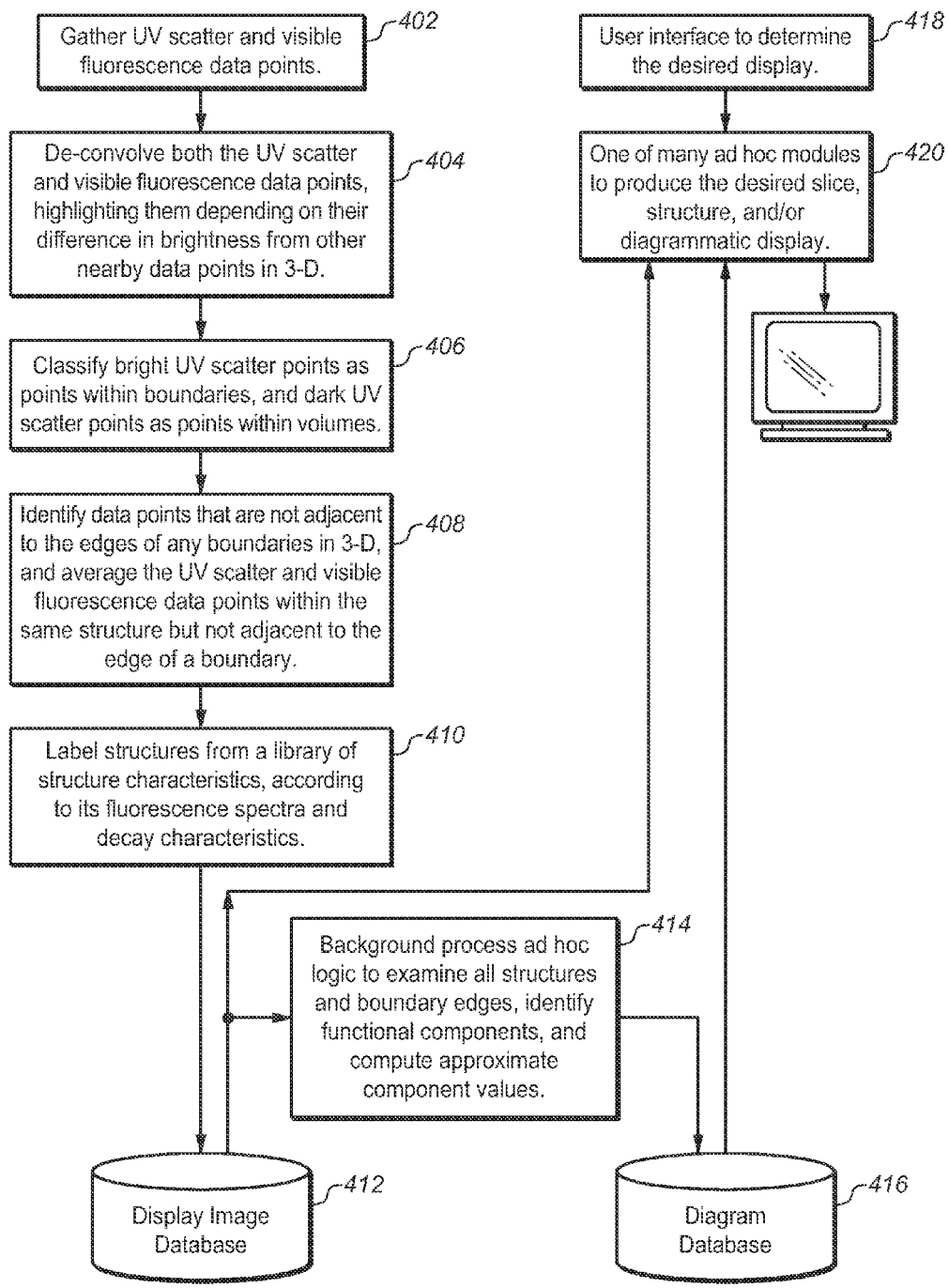
FIG. 5 is a block diagram of the overall system logic, including the construction of images from imagesensor inputs.

Turning next to FIG. 5, there is shown the overall system logic 400, including the construction of images from image sensor inputs. The unit is operated to obtain all data points within its field of view 402. The data points are then be de-convolved, first by linear means to reverse the blurring effects of the intersecting cones method of operation, then by non-linear means to partially reverse the effects of diffraction-limited operation 404 because Airy Disk diffraction cannot be deconvolved by linear means. Brighter points, being the presumed source of scattered light from the juxtaposition of structures having differing indexes of refraction, are marked as such, and points at the surfaces of structures are identified 406. To increase sensitivity and reduce noise, fluorescence spectra and decay characteristics are gathered throughout volumes at points that are not adjacent to boundaries; data points not near a boundary in 3D are identified, and the UV scatter and visible fluorescence spectra with the same structure but not near a boundary are averaged 408. Geometric and spectral information are then used to label structures from a library of structure characteristics, according to their size, shape, scatter, fluorescence spectra, and decay characteristics 410.

The refined and labeled 3D images are stored in a Labeled Image Database 412. A background process using ad hoc logic to examine all structures and the juxtapositions between structures to identify functional components and compute approximate component values 414 are used to build the Diagram Database 416 from the information in the Labeled Information Database 412. Users interact with a user interface module 418 to indicate what sort of display they wish to view. Several modules provide any the several available slice, structural, or diagrammatic views of the tissue being analyzed 420. Not shown is an interface to export the Diagram Database 416 to other computers for analysis or simulation.

Operation: When the LED array flashes an LED pixel, the light that returns to illuminate the image sensors illuminates a corresponding circular area 10 or more pixels in diameter. The central few pixels contains some information from the illumination point in the tissue sample, while the entire circular area contains stray light from the surrounding area that is still within the region where the cones of illumination and sensitivity intersect. Only the central pixel need be recorded, though at low light levels a more accurate reading may be obtained by averaging together several pixels at the center of the circular area.

Depending on sensor and electronics construction, it is possible to simultaneously flash several widely separated points while observing the centers of the separate circles of returning light, at the cost of a significant deterioration in the signal to noise ratio.

This process continues while shifting the point(s) being flashed over each virtual slice until every point in a 3D volume of tissue has been flashed and the light from the center(s) of the returning circle(s) of light has been collected.

One challenge in enhancing the images produced the process described herein using computer image enhancement is that the volume included in both the illuminating and the receptive cones will not be uniform or spherical. Where higher-resolution UV illumination is utilized, a portion of the illumination conical structure will be included in the point that is resolvable in visible light. The higher resolution conical structure of UV light may be inadvertently illuminating nearby tissue structures that are within a point resolvable in visible light. Those tissue structures have edges that run parallel to the surface of the UV cone, so microscopic single-virtual-voxel movements of the illuminating cone will include or exclude light from those parallel surfaces in what appears to be the light coming from the intended virtual voxel at the focal point of the UV illumination. Computer image enhancement would then turn this observational noise into artifacts that appear several virtual voxels away from the structure that caused an artifact.

Fortunately, using the inventive system and process there is a way to avoid nearly all of these artifacts: it is to use gradually dimming sides on the cone of UV illumination. This is done by gradually tapering the density of the edges of the optical stop. Single virtual voxel movements would then include a little more or less of the sides of problematical parallel structures, instead of including all or none of them, thereby reducing the magnitude of these artifacts in proportion to the number of virtual voxels that they become spread across. In practice, depending on the specifics of particular constructions, this will reduce the magnitude of these artifacts by an order of magnitude or so.

Note that linear distribution of artifact noise by this method results in a greater-than-proportionate reduction in the overall root mean square (RMS) energy of that noise, thereby reducing the effects of this artifact noise to a level where it becomes just another contributor to the overall system noise.

Microscopists using conventional transmitted-light microscopes have long known that higher resolutions can be achieved by using condensers to project images of diffuse light sources onto their specimens to illuminate them. This technique also improves the resolution of coincident focus microscopes as described herein, when those microscopes are used to directly produce images, rather than digitally scanning and processing images to produce higher resolutions.

Once all of the points within a volume have been recorded, they are compared and analyzed by a computer to reconstruct a 3D digital image, where pixels are depicted by how much brighter or dimmer they are than the average of their neighbors. This is a "relative" process, initially producing intermediate images that lack absolute references.

The linear deconvolution coefficients can be automatically computed during alignment, by collecting the convolution by observing a calibration point target, and then computing the deconvolution coefficients that when applied to the observed convolution yield as nearly as possible the point that is known to have produced the convolution.

Objective lenses are never perfectly corrected, so the deconvolution coefficients will doubtless differ, depending on which part of the image is being deconvolved.

Then, knowing that cellular systems are made of discrete structures having abrupt boundaries, image enhancement can be performed to find an image of discrete structures and abrupt boundaries that, if blurred as the present invention unavoidably blurs its images of cellular structures, result in the image recorded.

All image enhancement algorithms make presumptions about the nature of the reality that the images represent. This works well when the spectrum of possible realities is well understood, but it presents problems when looking at unfamiliar things, as is common in research settings. When presented with presumption-violating images, image enhancement algorithms may suffer internal computational problems, or produce nonsensical artifacts in their output. It is important to pass the information that an image violates image enhancement presumptions on to subsequent processing by man or machine, or the man or machine will be misled by what is presented. One approach is to have a plurality of image enhancement algorithms available, each based on different presumptions, and fall back to a less effective image enhancement algorithm when a violation of presumptions is detected in a more effective image enhancement algorithm.

This can be further refined by stitching together the results of different enhancements of the same image, to achieve the best possible enhancement of those parts of an image that conform to the most restrictive presumptions, and less enhancement to those parts of an image that violate the most restrictive presumptions.

Expected Future Developments: As more is learned about the optical characteristics of various cellular sub-structures, future image enhancement software is expected to be able to calibrate images based on the responses of some identifiable cellular sub-structures having known optical characteristics, e.g. "black" being the expected response from a homogeneous cellular sub-structure that scatters no light and does not fluoresce. Once some absolute readings have been obtained, the remainder of the relative readings can be adjusted to reflect absolute amount of light scattered or fluoresced, from which computations of chemical concentrations can be made.

It is expected to eventually be possible to mark, identify, and label cellular structures based on their shapes and fluorescence, thereby providing views of cells akin to Google's satellite photos with overlaid maps. This is an intermediate step along the way to implementing full functional diagramming, which is more like a fully detailed street map without any overlaid photos, the database for which could be used to computer-simulate those systems of cells.

Maximizing Performance: Electronic alignment eliminates the need for precise pixel-perfect positioning of the illumination and image sensing devices, or even the need for identical geometries in the illumination and image sensing devices. This is accomplished through electronic-alignment, wherein the positions where returning circles of light fall on the image sensor are noted during an alignment process, and they are then used to identify the central pixel(s) in subsequent analysis of images from tissue. As long as all sensors are attached to a common carrier, microscopic shifting, e.g., from normal wear, has no effect other than seeing the image slightly shifted in position, which has no practical effect on its operation.

Computed tomography separates the response from each illuminated point within a tiny region from those around it, increasing resolution by an order of magnitude. An order of magnitude improvement in resolution results in three orders of magnitude in the number of resolvable points, because that improvement works in each of the three dimensions.

The computed tomography algorithm looks at scattered UV light for points that are brighter or dimmer than surrounding points, and it links them together to recognize the presence of structure. Visible light indicates the presence of fluorescent chemical constituents, which assists in identifying the functions of structures.

Natural fluorescence can be even weaker than scattered UV, because it may be the result of fluorescence from chemicals that may be present in low concentrations. As a result, the returning light is very much weaker than the incident light. Therefore, careful attention must be paid to keep all incident light away from the sensors. This necessitates the extensive use of internal light-absorbing baffles and other light control measures that are not shown in the drawings. While stray light may be digitally subtracted from the sensor outputs, it would add enough noise to interfere with desired operation, as it now does with confocal microscopes.

The inventive microscope can push its visible-light objective lens to resolutions that have never before been achieved. This is not seen as being particularly difficult because the following effects tend to minimize the effects of aberrations:

First, the only part of the lens that carries visible light is the central portion, as determined by the central opening 124 in the complex optical stop 114, which is the easiest part of the lens to correct. Most lenses work best in their central region.

Second, the peripheral opening 116 through which the UV illumination passes is quite narrow, eliminating the effects of spherical aberration.

Third, differences in focal length between UV and visible caused by chromatic aberration have little effect, as the only effect of the visible light sensors being out of focus for the UV illumination is to enlarge the volume that lies at the intersection of both the illumination and reception cones, and thereby after analysis slightly increases system noise. If the objective lens has significant chromatic aberration, it becomes necessary to electronically align the system in each of the several colors to which each of the image sensors are sensitive.

Fourth, irregularities in field flatness cause corresponding waves in the virtual slices that have little if any effect on operation.

However, astigmatism and coma distortion would seriously impair performance, so an anastigmatic design of the objective lens assembly may be necessary for full performance across a wide field of view.

Combining in a single device the two image sensors 132 and 136 would eliminate the dichroic beam splitter. It may be possible to find an existing color camera imaging device with blue sensors working into the near UV range. Due to the lower NA for the returning light, the pixels do not need a 1:1 correspondence with the pixels in the LED array, so the image sensor(s) 132 and 136 may have fewer pixels than the LED array 106.

Real time operation requires a more complex scanning strategy than simply scanning all points in an isolated-point fashion. This is due to the latency of fluorescent decay, having to scan a large number of points, and because researchers may want high-speed monitoring of some processes, e.g., monitoring on a simulated oscilloscope the chemistry in a neuron as it fires. These functions are accomplished by having the controlling software manage several simultaneous processes, including:

(a) Initial images are produced from some separated pixels, with the intervening pixels filled in with subsequent scanning. This operation is similar to the interleaved display of JPEG files when viewed through a low baud rate connection.

(b) Movement is detected, and the image shifted accordingly.

(c) Points marked for high speed monitoring will shift as the image moves, and be monitored as frequently as the user requests.

(d) Regions that have moved relative to the rest of the image during prior scans can be re-scanned more frequently than other parts of the image.

Time permitting, when all of the above have been satisfied, the image will be re-scanned.

Greater performance is available by adopting the several strategies incorporated in optimizing MPEG encoding, for instance, by moving parts of the image by differing amounts.

Until high resolution UV LED arrays become available, it is necessary to use other available illumination devices to build the inventive microscope. One possibility is to use an electrostatically deflected cathode ray tube (CRT) having a phosphor that emits in the blue or near-UV region. Such phosphors have extremely short persistence, making them ideal for this application. Such a tube could rapidly illuminate arbitrary points under computer control.

It is also possible to use presently available Digital Light Processing (DLP) micro mirror devices, illuminated with a crosswise-oriented linear strip of UV LEDs. There is a provision in DLP devices to load individual strips of pixels, such that a new strip containing a several separated "on" pixels are loaded into the DLP, but are not yet activated; the "on" pixels in the previously-loaded and already-activated strip would be sequentially illuminated by individual UV LEDs. This process overlaps step 1 above; the DLP device would then be instructed to activate the new strip of pixels to be illuminated; and processing continues with step 1 above with step 2 overlapped.

Note that the pixels in DLP devices are buffered, so step 2 above for the previous strip can be overlapped with step 1 above for the current strip.

This approach appears to offer the best performance of present off-the-shelf devices, but would still be far inferior to using UV LED arrays designed for this purpose.

Flexibility of Process:

There are many ways of configuring mechanical, optical and electronic elements to achieve that operation. For example, the positioning of mirrors and beam splitter are to achieve a particular cylindrical form factor, which could easily be changed to achieve a different form factor. For another example, radically different sensor arrangements may be used as needed to differentiate between fluorescent materials. For another example, the lens configuration shown in FIG. 2 is for a particular arbitrarily chosen objective lens design, and almost any premium microscope objective could work. For another example, the particular illumination and image sensors utilized is a function of what is commercially available, and additional elements may be needed to utilize commercially available illumination and/or image sensing devices having varying pixel pitches. For another example, some or all of the multiple illumination and image sensing devices could be combined onto a single chip.

Other very different examples include the utilization of spinning Nipkow disks to scan images, bouncing scanners and images off of moving mirrors, etc. The creativity of the designers of digital microscopic imaging equipment has already been shown to be boundless. The present invention covers only the intersecting cone methodology, along with the provisions needed to make that work well. Once operation has been understood, engineers skilled in the optical sciences could easily adapt this process for their own convenience.

What is claimed as invention is:

1. A common focus microscope having an objective lens and an illumination system configured in combination such that illumination light from said illumination system passes in a first direction through a transparent illumination region of said objective lens to illuminate a region within the specimen, and reflected light and/or fluorescent light from the sample passes in a second direction through a transparent observation region of said objective lens, said objective lens having an opaque region therein separating said transparent illumination region from said transparent observation region.

2. The microscope of claim 1, further including a director disposed between said illumination system and said objective lens for scanning.

3. The microscope of claim 1, further including separated point scanning apparatus disposed between said objective lens and said illumination system to rapidly examine widely separated points of the sample to quickly recognize changes, wherein said changes are used to edit a retained image.

4. The microscope of claim 1, wherein the edges of said opaque region gradually fade from transparent to opaque.

5. The microscope of claim 4, further including a scanning system operatively connected to said objective lens.

6. The microscope of claim 5, wherein said scanning system further includes means to rapidly examine widely separated points on the specimen to quickly recognize changes, wherein said changes are used to edit a retained image.

7. A microscope, comprising:
an objective lens;
an illumination system that illuminates specific individual points within a tissue sample under observation;
an optical system configured in combination with said illumination system such that observations are made through regions of said objective lens different from those through which illumination is passed to a specimen, and wherein regions intervening between the regions through which observations are made and the regions through which illumination is passed are blocked in both directions, such that there are two separate and distinct transparent regions in said objective lens, a first through which illumination light passes to the tissue sample under observation and a second through which reflected and/or fluorescent light from the tissue sample passes; and
an image sensor capable of detecting and measuring the light coming from specific individual points within the tissue sample in the visual field.

8. The microscope of claim 7, further including a focusing mechanism to simultaneously adjust the focusing of both the illumination and image sensor to facilitate the observation of points in multiple virtual slices within the tissue sample, wherein the illuminating and observed light travel along concentric conical paths.

9. The microscope of claim 7, further including a mechanism to microscopically move one or more of said illumination system and said image sensor by sub-pixel amounts to facilitate increasing the effective resolutions of the devices.

10. The microscope of claim 7, further including a multi-color LED array as the illumination array.

11. The microscope of claim 7, wherein said image sensor is a color digital camera imaging device.

12. The microscope of claim 7, further including a computer program with executable instructions to simultaneously observe the fluorescent decay characteristics of multiple separated individual points within the tissue sample, then shift to observing overlapping sets of multiple separated individual points within the tissue sample after the fluorescent decay of the previous set of multiple separated individual points has substantially completed.

13. The microscope of claim 7, further including LEDs coupled with a computer programmed to provide an optical knife to perform nanosurgery within individual cells of the tissue sample.

14. The microscope of claim 7, further including an electronic alignment algorithm that eliminates the need for extremely precise construction to identify which pixel contains information from an illuminated point.

15. The microscope of claim 7, further including a program having an image reconstruction algorithm that first identifies structural elements from scattered light, then includes fluorescent decay information from pixels not adjacent to boundary edges.

16. The microscope of claim 7, wherein a first region is at the periphery of said objective lens, and a second region is in the center of said objective lens, having an opaque ring separating said first and second regions.

17. A method for detecting, measuring, and viewing microscopic details, comprising:

providing a common focus microscope having an objective lens and an illumination system configured in combination such that the illumination system illuminates a sample by passing illumination light in a first direction through a transparent illumination region of the objective lens to illuminate a region of the specimen, and reflected light and/or fluorescent light from the sample passes in a second direction through a transparent observation region of the objective lens, the objective lens having an opaque region therein separating the transparent illumination region from the transparent observation region;

simultaneously focusing illuminating beams and receptive fields coming from different non-adjacent directions at the same microscopic points in a sample being viewed; and rapidly changing the common focus points to build an image.

18. The method of claim 17, further including focusing illuminating beams from the periphery of the microscope objective lens, while receiving returning light through the center of the objective lens to facilitate computerized image enhancement.

19. The method of claim 17, further including focusing illuminating beams from the center of the objective lens, while receiving returning light from the periphery of the lens, so as to provide better raw resolution where computer enhancement is not being used.

20. A common focus microscope, comprising:

an objective lens; and an illumination system configured in relation to said objective lens such that a specimen is illuminated by light passing from said illumination system through a first region of said objective lens different from and non-adjacent to a second region through which returning light is passed for observation, said first and second regions separated by an opaque region within said objective lens.

* * * * *